March 5, 1957     B. W. ANDRUS ET AL     2,783,795
LOG-BARKING MACHINE HAVING BARK-ABRADING DISCS
AND BARK-REMOVING LOG-FEEDING ROLLERS
Filed Aug. 22, 1955     3 Sheets-Sheet 1
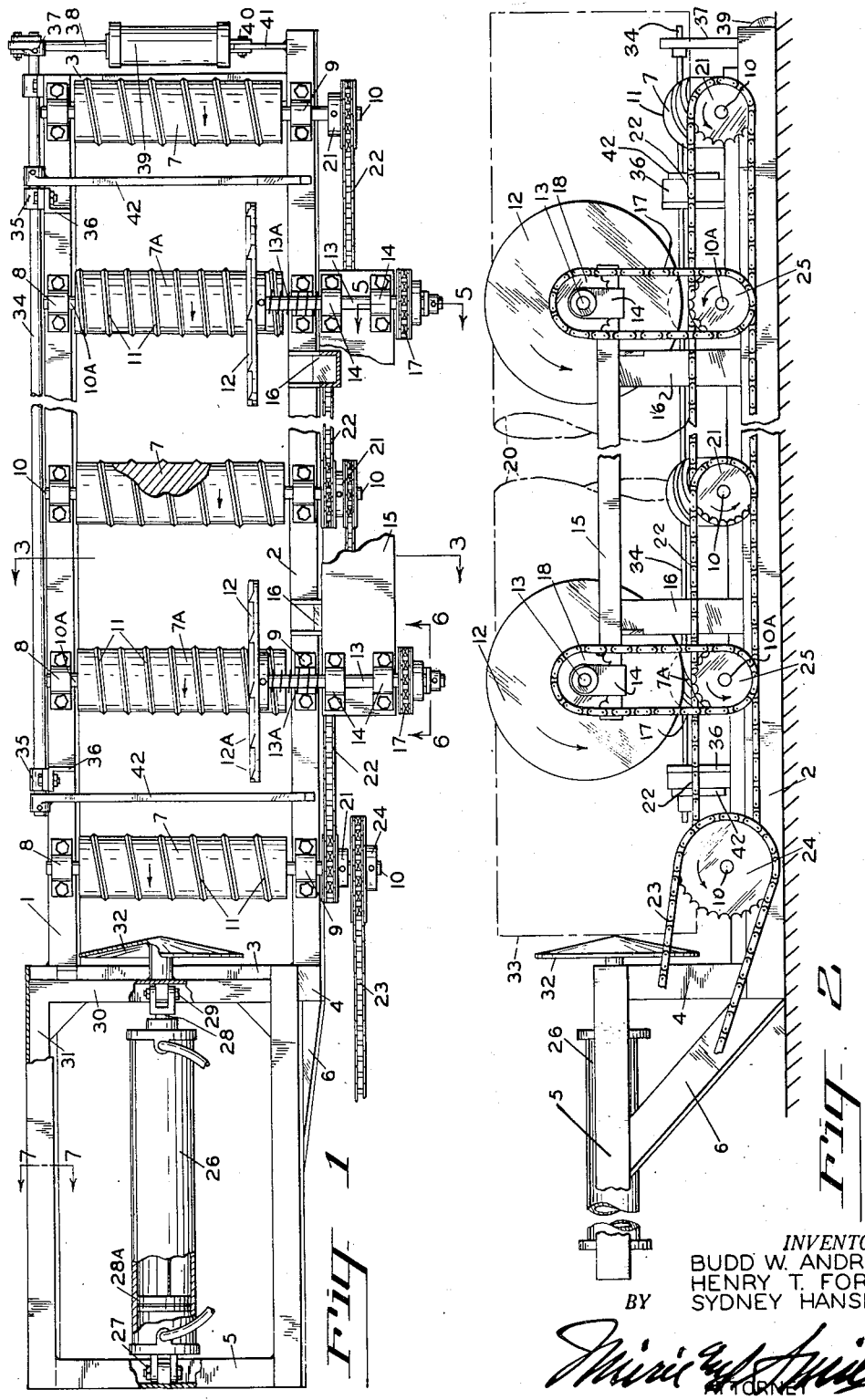
INVENTORS
BUDD W. ANDRUS
HENRY T. FORD
SYDNEY HANSEL
BY

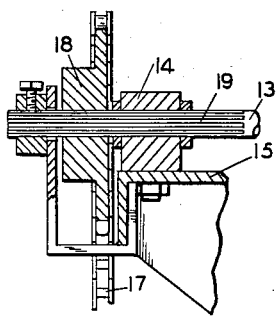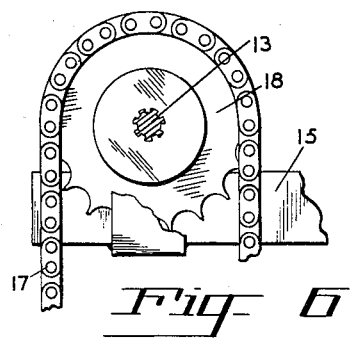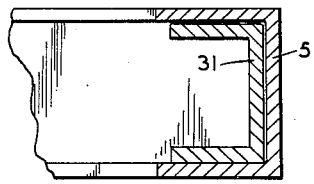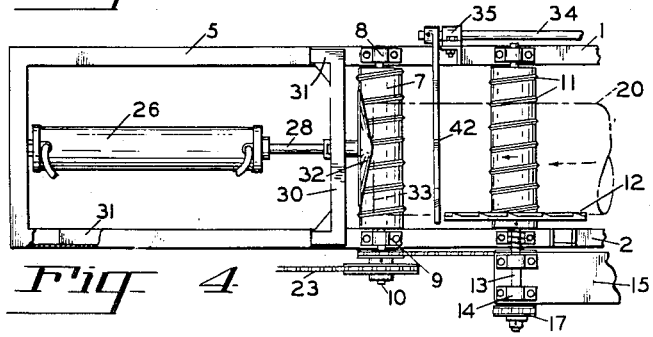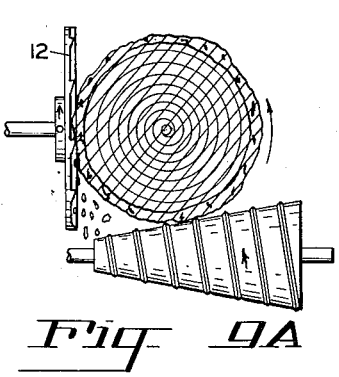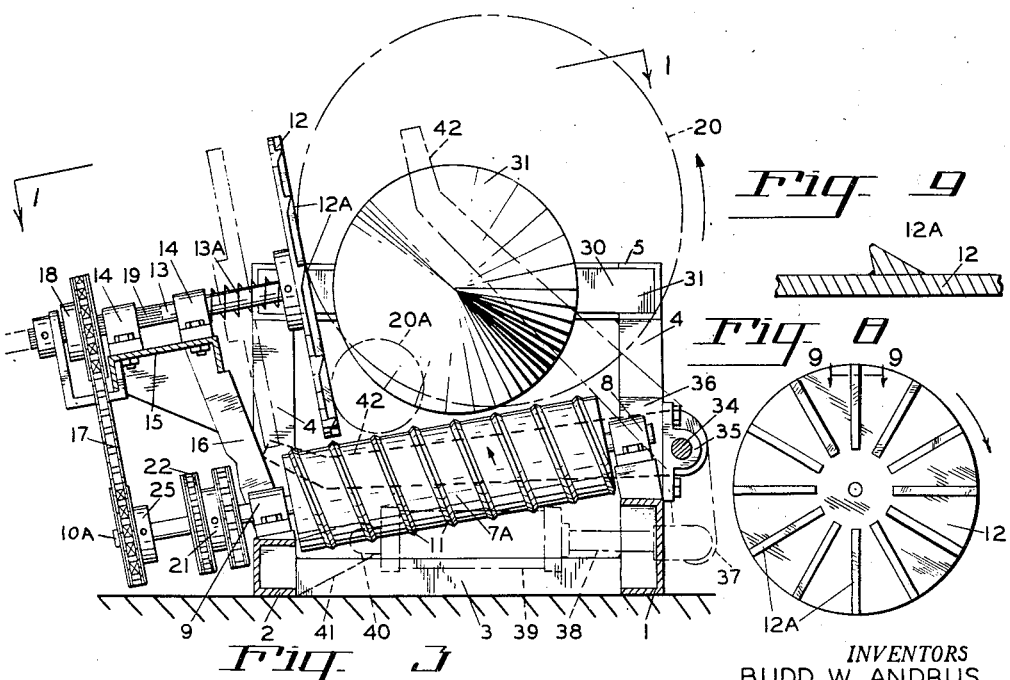

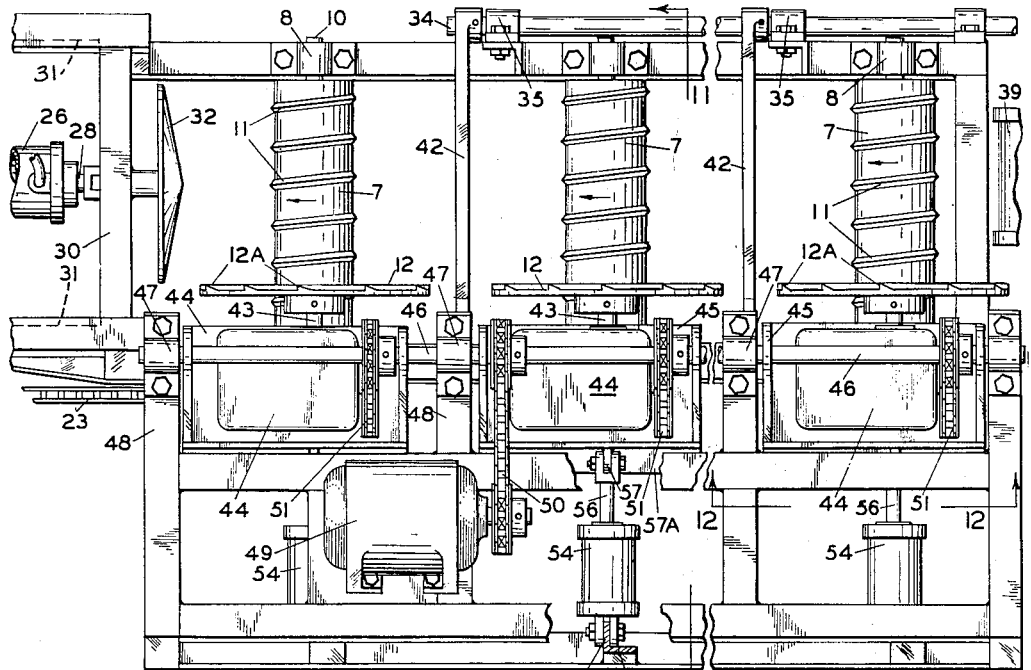
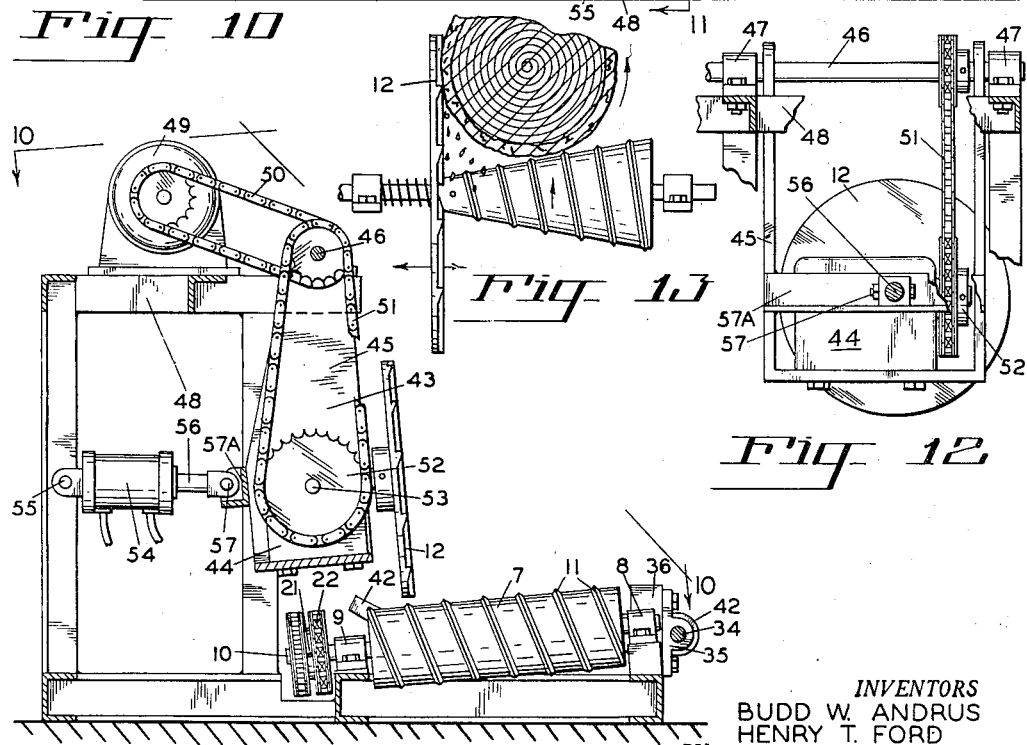

United States Patent Office 2,783,795
Patented Mar. 5, 1957

2,783,795

LOG-BARKING MACHINE HAVING BARK-ABRADING DISCS AND BARK-REMOVING LOG-FEEDING ROLLERS

Budd W. Andrus, Eugene, and Henry T. Ford, Mount Vernon, Oreg., and Sydney Hansel, Edmonds, Wash.

Application August 22, 1955, Serial No. 529,802

26 Claims. (Cl. 144—208)

The invention relates to a machine for removing bark from logs.

It is the primary object of the invention to provide a log-debarking machine that will quickly and efficiently remove bark from logs regardless of the log size by a novel combination of debarking actions.

A very important object, ancillary to the primary object, is in the provision of a log-debarking machine wherein the log-supporting platform forming means of the machine serves to move the log longitudinally along the machine while at the same time rotating the log and shearing bark from the log.

Another important object of the invention is to provide means for scraping or abrading bark from a log on the machine while the log is being rotated and subjected to a bark shearing action by said platform-forming means.

A still further object of the invention is in the provision of a means acting in opposition to said platform-forming means for longitudinally moving and retaining a log in position on the machine in opposition to the longitudinal movement created by the platform-forming means.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a plan view of our new and improved bark-removing machine for logs, as seen from the viewing line 1—1 of Figure 3 for convenience of illustration;

Figure 2 is a side elevation of the machine, with parts broken away for convenience of illustration, the log being shown in phantom outline;

Figure 3 is an enlarged-scale, vertical, transverse sectional view, taken on line 3—3 of Figure 1;

Figure 4 is a reduced scale fragmentary plan view showing the log in phantom outline as associated with the mechanism for moving the log forward and backward longitudinally of the machine;

Figure 5 is a fragmentary, enlarged-scale, vertical, transverse sectional view of the driving shaft and sprocket associated with the abrading disk, taken on line 5—5 of Figure 1;

Figure 6 is a fragmentary, enlarged-scale, vertical longitudinal sectional view of the driving sprocket shown in Figure 5, taken on line 6—6 of Figure 1;

Figure 7 is a fragmentary, enlarged-scale, vertical, transverse sectional view, taken on line 7—7 of Figure 1, looking in the direction indicated;

Figure 8 is an elevation of the bark-removing face of the abrading or scraping disks;

Figure 9 is a fragmentary, enlarged-scale sectional view, taken on line 9—9 of Figure 8;

Figure 9A is a fragmentary, vertical transverse sectional view of a modified embodiment of the machine and shows the relation between a cone shaped roller and a separately mounted revolving bark-scraping disk;

Figure 10 is a plan view of a second modification of the bark-removing machine for logs, as seen from the viewing line 10—10 of Fig. 11;

Figure 11 is a vertical cross-sectional view, taken on line 11—11 of Figure 10;

Figure 12 is a fragmentary, vertical, longitudinal sectional view of the swinging cradle used to support the bark-removing disks, taken on line 12—12 of Figure 10, and Figure 13 is a fragmentary, vertical transverse section of another modified roller and disk combination, the disk forming part of a cone-shaped roller.

Referring to Figures 1–9 of the drawings, the log-debarking machine of our invention is seen to comprise an elongated, rectangular supporting frame composed of longitudinal side frame members 1 and 2 connected together by cross frame members 3. Vertical standards 4 are carried at the rearward corners of the frame and support an auxiliary frame 5 in cantilevered relation thereto with diagonal braces 6. Means is provided on the main supporting frame for supporting a log thereon in the form of transversely extending, longitudinally spaced supporting rollers 7 and 7A journalled in bearings 8 and 9 at their ends on the frame members 1 and 2 respectively by means of shafts 10 and 10A, respectively.

Spiral cutting blades or ribs 11 are formed on the rollers 7 and 7A, the blades all being of the same hand in that the direction of the spiral is the same on all rollers. As will be noted, however, the spiral blades 11 of the rollers 7 are at a different angle than that of the rollers 7A for a purpose that will become subsequently apparent. The rollers serve as a log-supporting platform for the machine as shown in Figures 2, 3 and 4 wherein a log in phantom outline is designated by the numeral 20. Sprockets 21 are keyed to corresponding ends of the shafts 10, 10A and are interconnected by endless chains 22, one of which is positively driven from a drive chain 23 on a sprocket 24 from a source not shown.

Carried along one side of the frame above the rollers 7 and 7A are a plurality of longitudinally spaced abrading or scraping discs 12. To support the discs 12, standards 16 extend upwardly and outwardly from the frame member 2 and at their upper ends carry an auxiliary supporting platform 15. The discs 12 are rotatably supported by shafts 13 which are journaled in bearings 14 carried by the platform 15. The shafts 13 extend transversely and upwardly relative to the main supporting frame so that the discs are disposed along one side of the machine and have their bark-scraping surfaces tilted with respect to a vertical plane extending longitudinally of the machine.

The shafts 13 have sprockets 18 rotatably fixed thereon by splines 19, the sprockets being revolved by drive chains 17 entrained on sprockets 25 on the shafts 10A and thus also driven from main driving sprocket 24. Serrations in the form of radial ribs 12A mounted on the plane surfaces of the discs 12 facing the rollers 7 and 7A of the machine, provide a means for scraping or abrading bark from a log on the machine. The discs 12 and their shafts 13 are continuously biased inwardly over the roller-carrying frame of the machine by coil springs 13A carried by said shafts and reacting between the discs 12 and the bearings 14. This maintains continuous contact of the serrated surfaces 12A of the discs 12 with a log being debarked by the machine.

Carried by the auxiliary frame 5 at the rearward end of the main frame is a hydraulic cylinder 26 pivoted at its rear end to the frame 5 by a shackle 27. The cylinder 26 carries a double-acting piston 28A from which extends a plunger 28 pivotally connected by a shackle 29 to a U-shaped frame 30. To the forward side of the frame 30 is welded a stem which carries at its free end a conically shaped head 32 for engaging the end 33 of a log 20. To slidably support the head-actuating end of the plunger 28 the U-shaped frame 30 has its legs 31 slidably carried by side frame elements of the auxiliary frame 5 (see Fig. 7). By extension and retraction of plunger 28, the conical head 32 may be moved toward and away from the platform-forming rollers 7 and 7A.

In the operation of the device as thus far described, a log is moved longitudinally over the main frame forward end.

Rollers 7 and 7A are rotated counterclockwise, as viewed in Fig. 2, as the log is disposed longitudinally on the rollers. The spiral cutting blades 11 on rollers 7 being at different angles than those of rollers 7A cause the spiral blades to shear the cambium layer of the bark as the log is rotated on the rollers. Further, the spiral blades on the rollers, in addition to moving the log longitudinally along the frame toward abutment with head 32, cause the log to rotate counterclockwise about causing its longitudinal axis, as the log is viewed in Fig. 3, thus causing the log to roll into sidewise engagement with the scraping discs 12, whereby the ribs 12A of the discs abrade or scrape the bark from the log.

To assist in maintaining the log in lengthwise engagement with the faces of the discs 12, which define planar abrading profiles, said faces are disposed substantially at right angles to the axes of the rollers 7 and 7A, and preferably are inclined as shown in Fig. 3 so that the discs and rollers form a V-shaped trough. Thus, the force of gravity is added to the log-rotating effect of the spiral blades 11 to roll the log into the corner of the V-shaped trough, where it is subjected to both shearing and abrading debarking actions.

To reciprocate the log on the rollers 7 and 7A in order to remove bark from the entire length of the log or to simply hold the log in any given position in order to remove bark from any incompletely debarked portions, the cylinder-and-piston assembly 26, 28A may be operated. The piston plunger 28 may be extended so that the head 32 will either push the log axially back over rollers 7 and 7A or will hold the log in any desired axial position with respect to the rollers.

The cambium-shearing action of the machine is highly desirable in that the bark is removed with no damage to the wood surface of the log under the bark.

When the log is completely debarked, means is provided for removing the log from the rollers, this means comprising transversely extending kicker arms 42 disposed between certain of the rollers and keyed at their outer ends to a rock shaft 34. Rock shaft 34 is journalled in bearings 35 carried by posts 36 on the longitudinal frame member 1. To rock the shaft 34 and thereby dump a log off the machine, a cylinder 39 is pivotally carried by a pivot on a lug 41 at the forward end of the main frame of the machine. A piston rod 38 extends from the cylinder 39 and is connected with a crank 37 keyed to one end of the shaft 34 so as to rock the shaft and swing the arms in a log-ejecting direction.

The size of the log handled by the machine is immaterial, a small log being shown in phantom outline at 20A in Figure 3.

A modified structure of machine is shown in Figures 10–12, wherein each abrading disc 12 is carried by a shaft 43 driven from and journalled in a gear box 44 mounted on a U-shaped cradle 45. Each cradle 45 is swingably suspended from a lay shaft 46 supported by bearings 47 on a framework 48 disposed above the main frame of the machine. The swinging of each cradle 45 is controlled by a hydraulic cylinder-and-plunger assembly 54, 56 which are connected, respectively, by a pivot 55 to the supporting framework 48 and by a pivot 57 to a cross-bar 57A on the cradle 45. If desired, each cradle 45 may be biased toward a log on the machine by a counterweight on the cradle. Each gear box 44 has an input or drive shaft 53, and all of these shafts 53 are driven from a motor 49 on the framework 48. The motor 49 drives the lay shaft 46 through a chain drive 50 and the lay shaft 46 in turn is drivingly connected to each shaft 53 through a chain 51 and a sprocket 52 fixed on each shaft 53.

Rather than tilt the parallel axes of the discs 12 and the rollers 7 and 7A, an alternative method is shown in Figures 9A and 13 wherein the rollers are conically tapered. Moreover, as shown in Figure 13, the discs 12 may be mounted directly on the roller shafts 10.

Although certain specific embodiments of the invention have been shown and described, it is obvious that many modifications thereof are possible. The invention, therefore, is not to be restricted except in so far as is necessitated by the prior art and by the scope of the appended claims.

What I claim is:

1. A machine for removing bark from logs comprising an elongated supporting frame, rollers carried by said supporting frame for rotating and for axially moving a log longitudinally along said frame, said rollers having transversely extending axes of rotation and being spaced longitudinally along said frame, means carried by said rollers for cutting into a bark cover of a log disposed thereon while rotating such log, and means carried by said machine adjacent said rollers for abrading bark from a log as it is rotated by the rollers; said cutting means carried by said rollers comprising spiral cutting blades.

2. The combination of claim 1 wherein all of the spiral blades are of the same hand.

3. A machine as set forth in claim 1 wherein said abrading means is disposed on one side of said machine, and all of the spiral blades are of the same hand and of a direction to roll a log on said rollers toward said abrading means.

4. A machine as set forth in claim 1 wherein said abrading means is disposed on one side of said machine, and the upper log-supporting surfaces of said rollers are inclined relative to the horizontal to roll a log thereon toward said abrading means.

5. The combination of claim 4 wherein said rollers are cylindrical and inclined downwardly toward said one side.

6. The combination of claim 4 wherein said rollers are conical with the apices thereof disposed adjacent said one side.

7. A machine for removing bark from logs comprising an elongated supporting frame, rollers carried by said supporting frame for rotating and for axially moving a log longitudinally along said frame, said rollers having transversely extending axes of rotation and being spaced longitudinally along said frame, means carried by said rollers for cutting into a bark cover of a log disposed thereon while rotating such log, and means carried by said machine adjacent said rollers for abrading bark from a log as it is rotated by the rollers; said cutting means carried by said rollers comprising spiral cutting blades, and the angle of the spiral blades on certain rollers being different than the angle of the blades on other of said rollers.

8. A machine as set forth in claim 7 wherein all of said spiral blades are of the same hand.

9. A machine as set forth in claim 7 wherein said abrading means is disposed on one side of said machine, and all of the spiral blades are of the same hand and of a direction to roll a log on said rollers toward said abrading means.

10. A machine as set forth in claim 7 wherein said abrading means is disposed on one side of said machine, and the upper log-supporting surfaces of said rollers are inclined relative to the horizontal to roll a log thereon toward said abrading means.

11. The combination of claim 10 wherein said rollers are cylindrical and inclined downwardly toward said one side.

12. The combination of claim 10 wherein said rollers are conical with the apices thereof disposed adjacent said one side.

13. A machine for removing bark from logs comprising an elongated supporting frame, rollers carried by said supporting frame for rotating and for axially moving a log longitudinally along said frame, said rollers having transversely extending axes of rotation and being spaced longitudinally along said frame, means carried by said rollers for cutting into a bark cover of a log disposed thereon while rotating such log; means carried by said machine adjacent said rollers for abrading bark from a log as it is rotated by the rollers, said abrading means comprising discs disposed along one side of said frame, and said discs having abrading surfaces; said cutting means carried by said rollers comprising spiral blades for additionally retaining a log on the machine in engagement with the abrading discs; and means for rotating said rollers and said discs.

14. A machine as set forth in claim 13 wherein said discs have transversely extending axes of rotation, means supporting said discs for movement substantially axially thereof, and means for moving said discs relative to a log on said rollers.

15. A machine as set forth in claim 13 wherein said discs are mounted on shafts extending transversely of said frame, said discs being keyed on and movable axially of said shafts, and spring means biasing said discs axially of their shafts to engage a log on said rollers.

16. A machine as set forth in claim 13 wherein said discs have transversely extending axes of rotation, means supporting said discs and movably mounted on said frame for movement transversely thereof, and fluid-operated jack means between said frame and said supporting means for moving said discs relative to a log on said rollers.

17. A machine for removing bark from logs comprising an elongated supporting frame, transversely extending, longitudinally spaced rollers carried by said supporting frame for rotating and for axially feeding a log longitudinally along said frame, means carried by said rollers for cutting into a bark cover of a log disposed thereon while rotating such log, means carried by said machine adjacent said rollers for abrading bark from a log as it is rotated and fed by the rollers, and means mounted at one end of said frame for axially moving a log longitudinally of said frame in a direction opposite to such axial feeding caused by the rotation of said rollers.

18. A machine for removing bark from logs comprising an elongated supporting frame, means forming a log-supporting platform on said frame, said platform-forming means including means for rotating a log while axially feeding such log longitudinally along the supporting frame, means carried by said frame for axially moving a log on the platform in a direction opposite to such axial feeding movement created by the platform-forming means, and means carried by said supporting frame to cooperate with said platform-forming means to abrade the bark from a log on the platform.

19. A machine for removing bark from logs comprising an elongated supporting frame, means forming a log-supporting platform on said frame, said platform-forming means including means for rotating a log while axially feeding such log longitudinally along the supporting frame, means carried by said frame for axially moving a log on the platform in a direction opposite to such axial feeding movement created by the platform-forming means, and means carried by said supporting frame to cooperate with said platform-forming means to abrade bark from a log on the platform; said platform-forming means comprising a plurality of longitudinally spaced, transversely extending rollers having spiral cutting blades thereon, and the hand of said blades being in the same direction so as to bias a log toward one side of the supporting frame.

20. A machine for removing bark from logs comprising an elongated supporting frame, means forming a log-supporting platform on said frame, said platform-forming means including means for rotating a log while axially feeding such log longitudinally along the supporting frame, means carried by said frame for axially moving a log on the platform in a direction opposite to such axial feeding movement created by the platform-forming means, and means carried by said supporting frame to cooperate with said platform-forming means to abrade bark from a log on the platform; said platform-forming means comprising a plurality of longitudinally spaced, transversely extending rollers having spiral cutting blades thereon, and the hand of said blades being in the same direction so as to bias a log toward one side of the supporting frame; and said abrading means comprising longitudinally spaced discs carried by said frame along said one side thereof and above said rollers.

21. A machine for removing bark from logs comprising an elongated supporting frame, means forming a log-supporting platform on said frame, said platform-forming means including means for rotating a log while axially feeding such long longitudinally along the supporting frame, means carried by said frame for axially moving a log on the platform in a direction opposite to such axial feeding movement created by the platform-forming means, and means carried by said supporting frame to cooperate with said platform-forming means to abrade bark from a log on the platform; said platform-forming means comprising a plurality of longitudinally spaced, transversely extending rollers having spiral cutting blades thereon, and the hand of said blades being in the same direction so as to bias a log toward one side of the supporting frame; and said abrading means comprising longitudinally spaced discs carried by said frame along said one side thereof and above said rollers, said discs each having a serrated log-engaging surface disposed at an angle to said rollers.

22. The combination of claim 21 wherein said rollers are cylindrical and inclined downwardly toward said one side.

23. The combination of claim 21 wherein said rollers are conical with the apices thereof disposed adjacent said one side.

24. A machine as set forth in claim 21 wherein said discs have transversely extending axes of rotation, means supporting said discs for movement substantially axially thereof, and means for moving said discs relative to a log on said rollers.

25. A machine as set forth in claim 21 wherein said discs are mounted on shafts extending transversely of said frame, said discs being keyed on and movable axially of said shafts, and spring means biasing said discs axially of their shafts to engage a log on said rollers.

26. A machine as set forth in claim 21 wherein said discs have transversely extending axes of rotation, means supporting said discs and movably mounted on said frame for movement transversely thereof, and fluid-operated jack means between said frame and said supporting means for moving said discs relative to a log on said rollers.

References Cited in the file of this patent

UNITED STATES PATENTS

| | | |
|---|---|---|
| 154,912 | Rodgers | Sept. 8, 1874 |
| 528,664 | Folin | Nov. 6, 1894 |
| 987,828 | Schenck | Mar. 28, 1911 |
| 1,087,959 | Lisherness et al. | Feb. 24, 1914 |
| 1,567,441 | Howard | Dec. 29, 1925 |
| 1,609,474 | Jacobson | Dec. 7, 1926 |
| 1,818,657 | Talbott et al. | Aug. 11, 1931 |
| 2,436,555 | Daniell | Feb. 24, 1948 |
| 2,641,289 | Merrifield | June 9, 1953 |
| 2,657,722 | Hillbom | Nov. 3, 1953 |